United States Patent
Kobayashi

(10) Patent No.: US 7,817,508 B2
(45) Date of Patent: Oct. 19, 2010

(54) OPTICAL DISK UNIT, CONTROL METHOD FOR OPTICAL DISK UNIT, AND COMPUTER READABLE STORAGE MEDIUM

(75) Inventor: Toshikazu Kobayashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 604 days.

(21) Appl. No.: 11/782,075

(22) Filed: Jul. 24, 2007

(65) Prior Publication Data

US 2008/0025186 A1    Jan. 31, 2008

(30) Foreign Application Priority Data

Jul. 28, 2006  (JP)  ............................. 2006-207181
Aug. 25, 2006  (JP)  ............................. 2006-229816

(51) Int. Cl.
   *G11B 7/00*    (2006.01)
(52) U.S. Cl. ............... 369/44.32; 369/53.18; 369/53.28
(58) Field of Classification Search ............... 369/44.32
   See application file for complete search history.

(56) References Cited

U.S. PATENT DOCUMENTS

| | | | |
|---|---|---|---|
| 6,298,019 | B1 | 10/2001 | Watanabe et al. |
| 6,449,232 | B1 | 9/2002 | Kuwahara et al. |
| 2001/0030915 | A1 | 10/2001 | Suzuki |
| 2002/0031072 | A1 | 3/2002 | Kamiyama et al. |
| 2002/0087203 | A1* | 7/2002 | Schmitt et al. ................. 607/60 |
| 2004/0095859 | A1* | 5/2004 | Kobayashi et al. ....... 369/44.29 |
| 2005/0052977 | A1* | 3/2005 | Sun .......................... 369/53.23 |

FOREIGN PATENT DOCUMENTS

| | | |
|---|---|---|
| CN | 1318830 | 10/2001 |
| JP | 61-158036 | 7/1986 |
| JP | 04186532 | 7/1992 |
| JP | 09-265722 | 7/1997 |

(Continued)

OTHER PUBLICATIONS

Notification of Reason(s) for Refusal with partial translation, dated Sep. 2, 2008, for corresponding Japanese Patent Application JP 2006-229816.

(Continued)

*Primary Examiner*—Lixi Chow
(74) *Attorney, Agent, or Firm*—Katten Muchin Rosenman LLP

(57) ABSTRACT

An optical disk unit, for reading signals stored on an optical disk medium, is provided with an optical pickup 23 selectively irradiating light of one wavelength, from several mutually different wavelengths, to an optical disk medium by means of a single objective lens and outputting signals based on light reflected by the optical disk medium, a drive section for causing relative movement of the objective lens of the optical pickup with respect to a surface of the optical disk medium, wherein a peak level of a fake signal generated in the received light signal based on surface reflection at the optical disk surface while the objective lens is being moved relative to the optical disk medium surface by the drive section is detected, and the received light signal is compared with a threshold value that is set based on the detected peak level, to detect reflected light of a data storage layer.

4 Claims, 9 Drawing Sheets

FOREIGN PATENT DOCUMENTS

| | | |
|---|---|---|
| JP | 2986587 | 12/1999 |
| WO | 2005/055213 | 6/2005 |

OTHER PUBLICATIONS

Notice of Preliminary Rejection dated Aug. 29, 2008, for corresponding Korean Patent Application 10-2007-0076509.

Chinese Office Action dated Oct. 31, 2008, from the corresponding Chinese Application.

European Search Report and Annex to the European Search Report dated Dec. 20, 2007, for corresponding European Patent Application EP 07 01 4790.

Korean Decision of Refusal dated Apr. 30, 2009, from the corresponding Korean Application.

* cited by examiner

US 7,817,508 B2

OPTICAL DISK UNIT, CONTROL METHOD FOR OPTICAL DISK UNIT, AND COMPUTER READABLE STORAGE MEDIUM

CROSS-REFERENCE TO RELATED APPLICATIONS

The priority application Numbers JP 2006-207181 and JP 2006-229816 upon which this patent application is based are hereby incorporated by reference.

BACKGROUND OF THE INVENTION

1. Field of the Invention

The present invention relates to an optical disk unit, including a CD-ROM, CD-R or CD-RW drive, a DVD drive, or a Blu-Ray Disc (trademark) drive, a control method for such a disk unit, and a computer readable storage medium.

2. Description of the Related Art

Various types of optical disk medium have been developed in recent years, and they are appropriately used depending on the purpose. Generally, optical disk media have a structure with a plurality of layers arranged on top of one another. That is, regardless of the type of optical disc medium, protective layers are provided on both surfaces of the medium, and data storage layers for storing signals are formed enclosed by the protective layers. However, many parameters are different, such as thickness of the optical disk medium itself, distance from a surface of the protective layer to a surface of a data storage layer (signal surface), number of signal surfaces (for example, with a DVD, there is a maximum of two signal surfaces), and wavelength of a laser to be used in reading out information from the signal surface.

For this reason, it is normal to use a dedicated drive for each type of optical disk medium. However, with the need to purchase and install a dedicated drive for each type of optical disk, the user must master the operations of each drive, and the financial burden is also significant. There has therefore been a demand for a drive (optical click drive) that can handle many types of optical disk media.

For a drive to handle these many types of optical disk media, technology is being developed to use a different wavelength of light source (laser) used in reading out information for each type of optical disk medium, using an optical element having wavelength selection characteristics in a single objective lens, and changing a numerical aperture of the lens.

An optical pickup 1 for such a drive, as exemplarily shown in FIG. 8, is constructed including a light-emitting element 11 for outputting laser light of a plurality of wavelengths, a beam splitter 12, a photodetector 13 and an objective lens body 14. Also, the objective lens body 14 is comprised of an objective lens 14L and a hologram element 14H including a diffraction grating.

The light-emitting element 11 is a semiconductor laser element for outputting laser light of, for example, three mutually different wavelengths (a so-called three-wavelength laser). The three wavelengths here are controlled so that in the case of handling, for example, a Blu-ray disk, a DVD (Digital Versatile Disk) and a CD (Compact Disk), laser light is output having a wavelength of 405 nanometers for the Blu-ray disk, 650 nanometers for the DVD, and 780 nanometers for the CD.

The beam splitter 12 guides light output by the light emitting element 11 to the objective lens body 14. This beam splitter 12 also guides light that is input by being reflected by the optical disk body and passing through the objective lens body 14 to the photodetector 13. The photodetector 13 is provided with a plurality of light detection elements arranged in a matrix of N×N, for example. This photodetector 13 is also provided with a cylindrical lens, for example for measuring beam diameter. Light that has been guided by the beam splitter 12 reaches the respective plurality of light receiving elements by way of this cylindrical lens. The photodetector 13 then respectively outputs signals for strength of light that has been respectively detected by the plurality of light receiving elements.

The hologram element 14H of the objective lens body 14 diffracts laser light that has been guided by means of the objective lens 14L and reflected by the medium so as to become a predetermined numerical aperture (NA) for each wavelength of laser light, and guides the diffracted laser light to the beam splitter 12. Also, the objective lens 14L is an aspherical lens, and refracts and outputs light that has been guided from the light emitting elements through the beam splitter 12 and the hologram element 14H so that focal points are focused at positions specified by focal distance F that is different for each wavelength. This objective lens 14L also condenses laser light that has been reflected by the medium and guides it to the hologram element 14H laser.

A signal representing focus error of laser light on the storage surface of the optical disk medium (focus error signal; FE signal) and a signal equivalent to a sum of strengths of light that has reached the light receiving elements (pull-in signal; PI signal) are generated from a signal (RF signal) output by the photodetector 13. It is also standard practice to generate a signal representing tracking error (TE signal) etc. from the signal output by the photodetector 13, but detailed description thereof has been omitted here.

Here, the PI (pull-in) signal is a signal shown as (a) in FIG. 9. Specifically, this PI signal has a peak at a positioned where focus is optimum. Also, the FE signal is shown as (b) in FIG. 9. Specifically, the FE (focus error signal) becomes substantially "0" when focus is achieved. Also, when the distance between the optical disk medium changed around a position where focus is achieved, the FE signal has positive and negative peaks respectively at points of certain distance from a position where focus is achieved, and the FE signal crosses zero (crosses a reference position) at a position where focus is achieved.

In FIG. 9, an example is shown of each signal in the case where the objective lens 14L of the optical pickup 1 is moved in a direction approaching the optical disk medium surface, starting at a position separated from the optical disk medium. When light that has been reflected by the optical disk medium surface arrives at the focal point in the optical pickup 1, a peak occurs in the PI signal (S) due to the surface reflection, as shown in (a) of FIG. 9. If the objective lens 14L of the optical pickup 1 is brought closer to the surface of the optical disk medium, the surface reflection light becomes stray light inside the optical pickup 1, and this stray light is detected as a fake signal (Fake). This fake signal is not limited to one signal, and can also be a plurality of signals. If the optical pickup 1 is brought closer to the disk surface, reflected light (T) at the signal surface is detected.

Similarly, for the FE signal which is shown as (b) in FIG. 9, at positions where the surface reflection (S), fake signal (Fake) and reflected light (T) at the signal surface are respectively obtained, a signal representing that an image has been formed is detected.

With the optical disk unit, it is possible to readout signals corresponding to the plurality of optical disk media by controlling the distance between the objective lens body 14L and the medium surface so that a distance from a planar section P of the objective lens 14 to the signal surface inside the medium becomes the focal distance F, that is, so that it is possible to achieve focus on the signal surface. Here, whether or not focus is achieved is determined using the FE signal and/or PI signal, and in focus is determined, for example, when an absolute value for the FE signal exceeds a first threshold level (FZC1), but is less than a second threshold value (FZC2) (approaches "0"). In focus is also determined when the PI signal exceeds a specified threshold value.

An example of an optical disk unit that uses such an optical pickup is disclosed in Japanese patent application 2986587.

Incidentally, depending on the optical disk medium, there are cases where the signal surface of the disk is inclined along a radial axis direction. In such a case, a distance from the objective lens to the signal surface is changed at the rotation cycle accompanying rotation of the optical disk medium. This phenomenon is called axial runout.

If axial runout occurs, there are cases where a fake signal (Fake) appears repeatedly a plurality of times in the PI signals and FE signals, and a result (F2, F3) of the fake signal (FAKE) constituting substantially the same peak level repeatedly appearing is that there are cases where discrimination between a reflected light (T) at the signal surface where focus should actually be achieved and a fake signal appearing due to axial runout is difficult (FIG. 9).

Therefore, attention has focused on the fact that the level of reflected light (T) at the signal surface is generally higher than the fake signal (Fake), and a method has been considered where a threshold value that is a higher level than the level of a fake signal (Fake) that would be expected due to the occurrence of axial runout is set experimentally. For example, the threshold value is set by writing to a read only memory (ROM) at the time of leaving the factory etc., and detection of a reflection at the signal surface (FOK, FZC1 shown by the dotted line in FIG. 9) when a signal exceeds this threshold value.

However, as shown in FIG. 10, the level of a signal detected by the optical pickup becomes low overall due to variations in reflectance of the optical disk medium inserted, dust attached to the optical pickup, or environmental variations, such as temperature. When the level of a signal detected by the optical pickup becomes low, in the case of where the predetermined threshold values FOK, FZC1 are set as described above and fixed values are always used, there may be cases where the level of reflected light at the signal surface does not reach this threshold value and it will be difficult to achieve focus at the signal surface.

SUMMARY OF THE INVENTION

The present invention has been conceived in view of the above described situation, and an object of the invention is to provide an optical pickup unit that is capable of performing focus control on a signal surface, regardless of the state of the optical pickup.

According to one aspect of the present invention, there is provided an optical disk unit, being an optical disk unit for reading signals stored on an optical disk medium, comprising an optical pickup selectively irradiating light of one wavelength, from several mutually different wavelengths, to an optical disk medium by means of a single objective lens and outputting signals based on light reflected by the optical disk medium, a drive section for causing relative movement of the objective lens of the optical pickup with respect to a surface of the optical disk medium, a signal output section for receiving light reflected by the optical disk medium and outputting received light signals based on the received light, and a control section for detecting peak level of a fake signal generated in the received light signal based on surface reflection at the optical disk surface while the objective lens is being moved relative to the optical disk medium surface by the drive section, comparing the received light signal with a threshold value that is set based on the detected peak level, and detecting reflected light of a data storage layer.

DESCRIPTION OF THE PREFERRED EMBODIMENT

Figure 1:
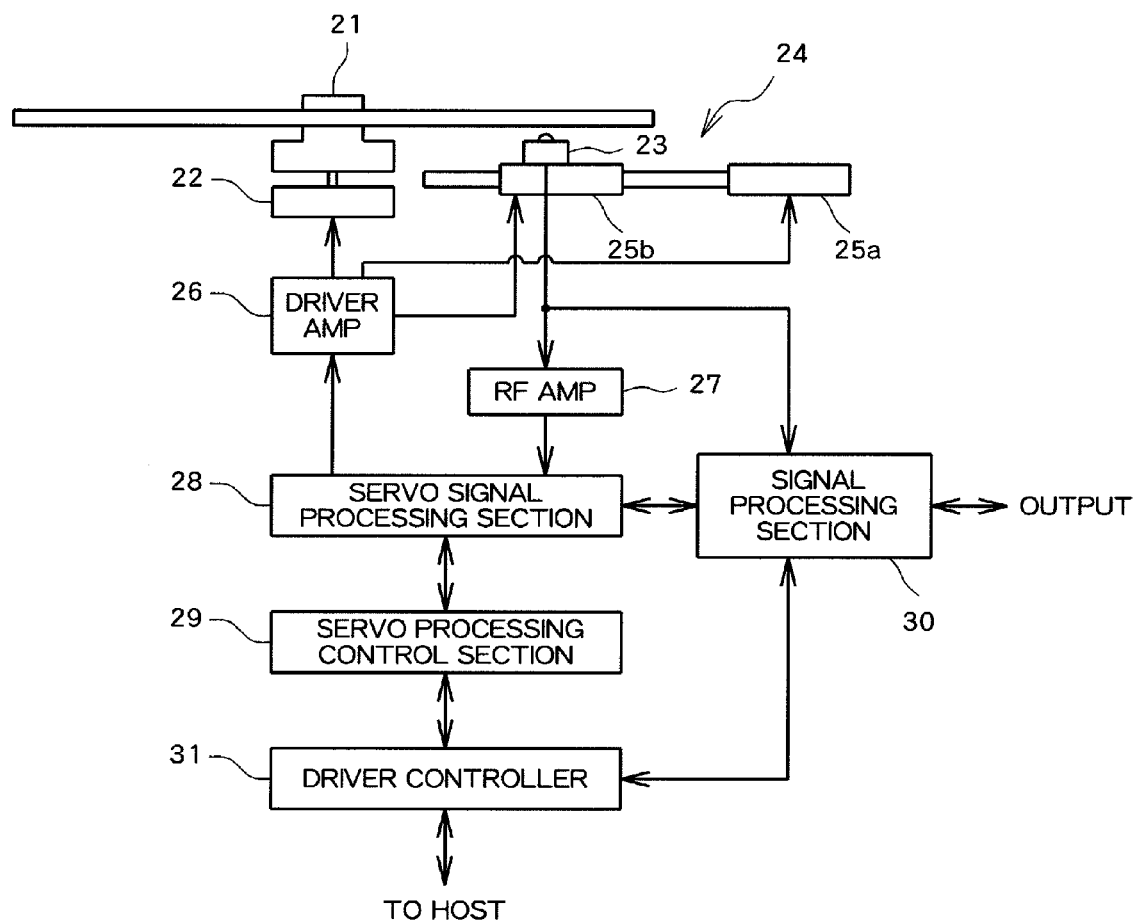
FIG. 1 is a block diagram showing a structural example of an optical disk unit of an embodiment of the present invention.

An embodiment of the present invention will now be described with reference to the drawings. As shown in FIG. 1, an optical disk unit of the embodiment of the present invention comprises a medium support section 21, a spindle motor 22, an optical pickup 23, a biaxial actuator 24, a feed motor 25a, a focus control actuator 25b, a driver amp 26, an RF amp 27, a servo signal processing section 28, a servo processing control section 29, a signal processing section 30 and a drive controller 31.

Figure 8:
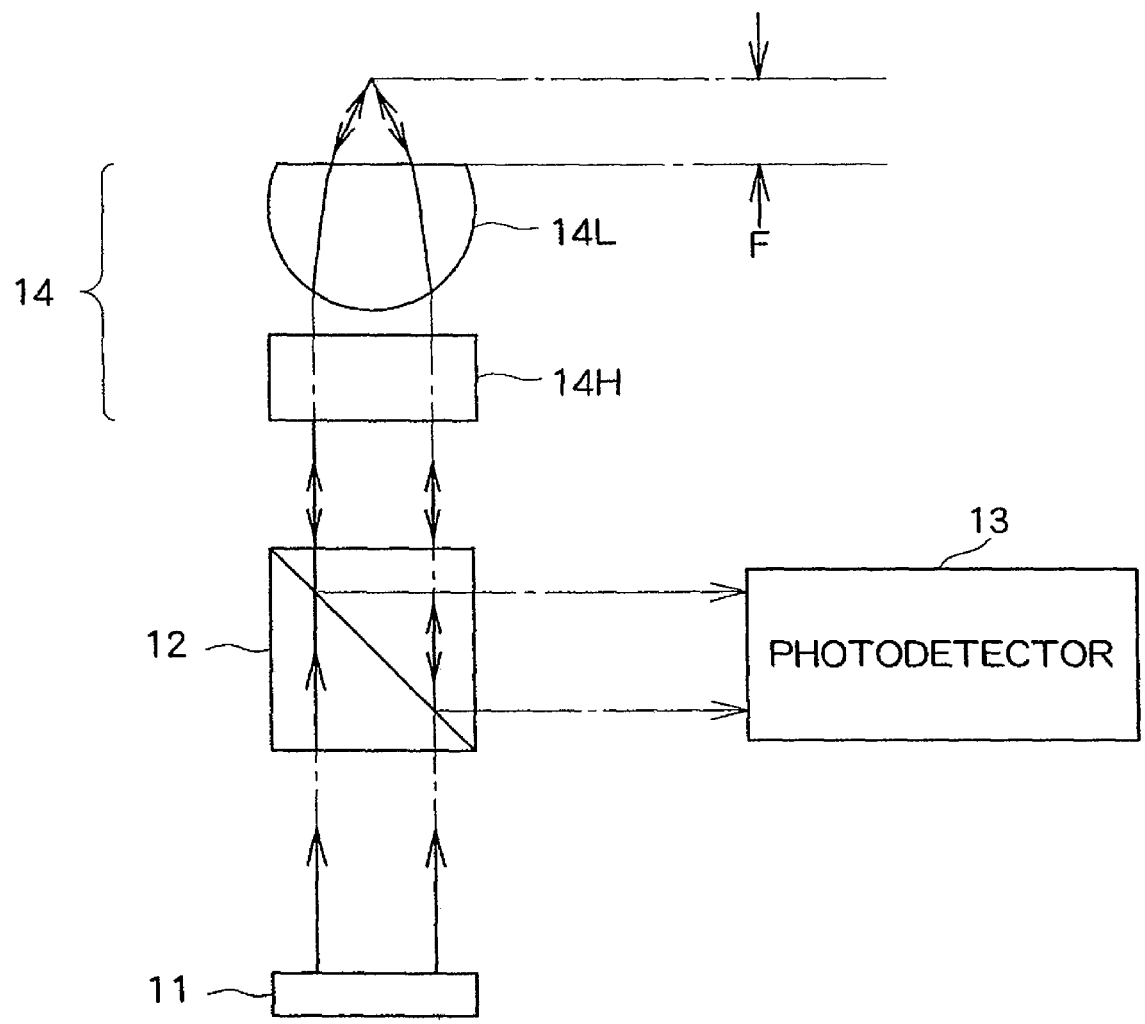
FIG. 8 is an outline view showing a structural example an optical pickup also used in the optical disk unit of an embodiment of the present invention.
Figure 9:
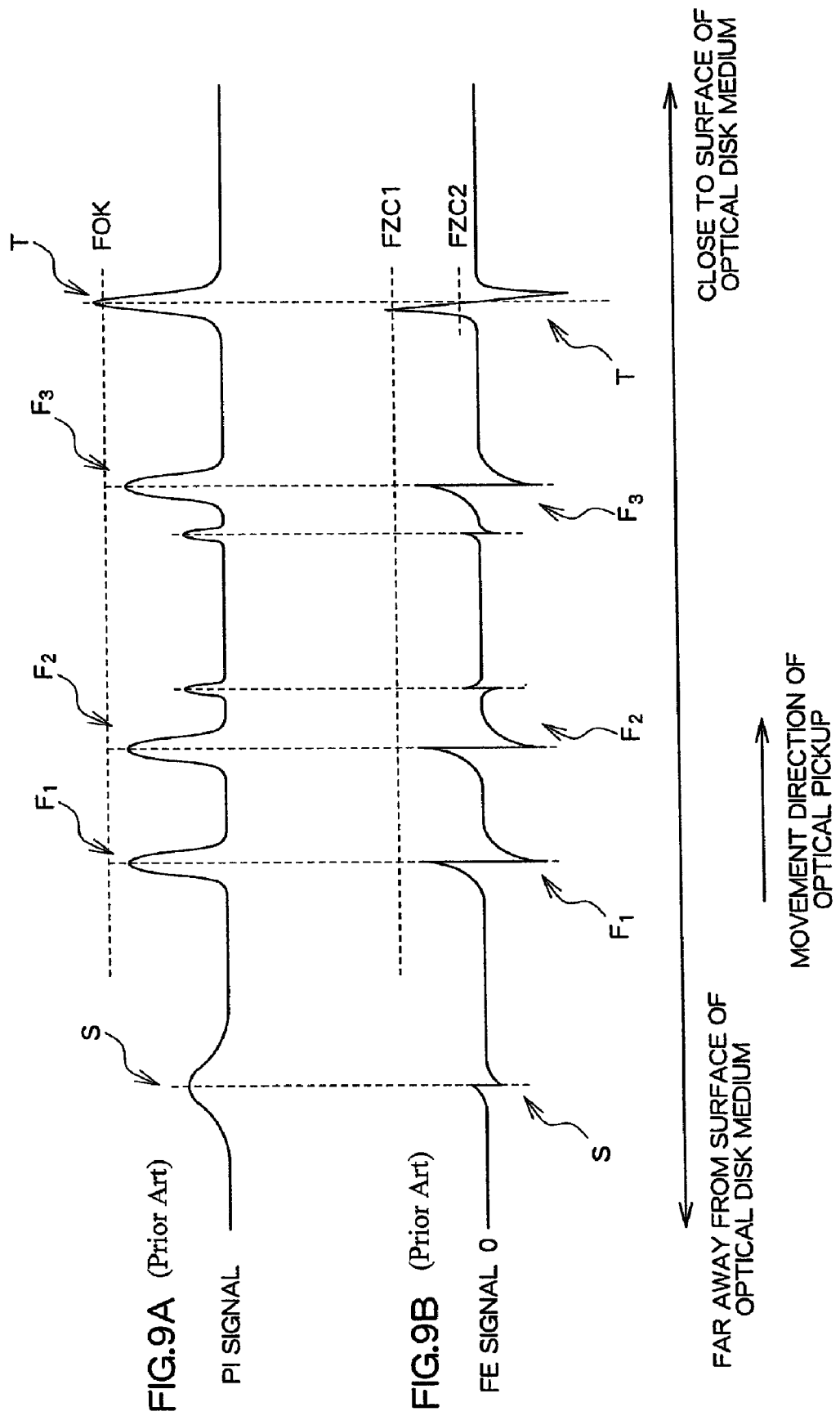
FIG. 9 is an explanatory drawing showing one example of signals detected by an optical pickup of an optical disk unit.
Figure 10:
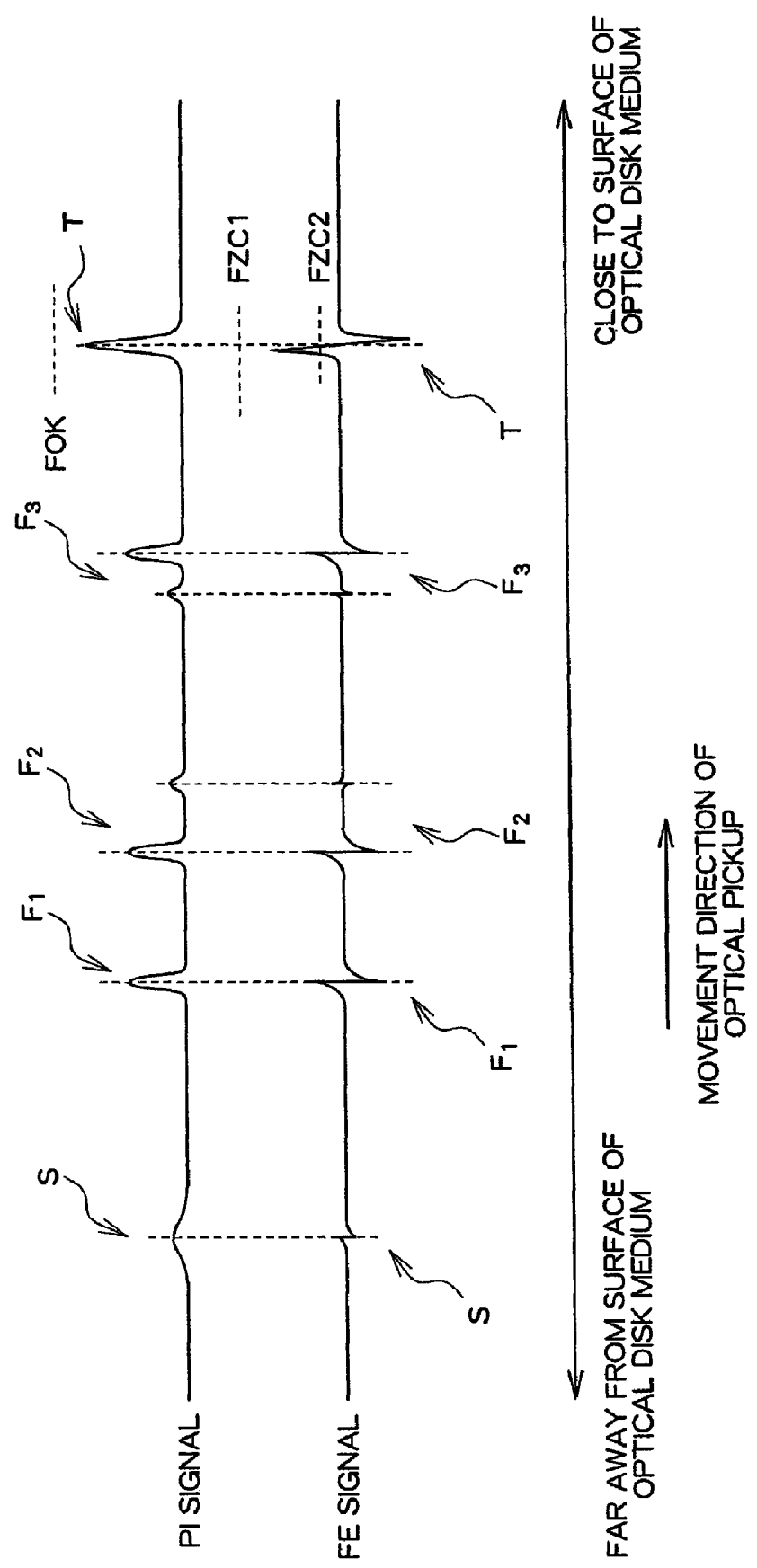
FIG. 10 is an explanatory drawing showing another example of signals detected by an optical pickup of an optical disk unit.

The medium support section 21 supports an optical disk medium in a rotatable state. Also, this medium support section 21 rotates the optical disk medium using power transmitted from the spindle motor 22. The optical pickup 23 is the same as the optical pickup shown in FIG. 8, and here can be moved in two directions, namely a radial direction of the optical disk medium and a direction perpendicular to the surface of the optical disk medium, by the biaxial actuator 24.

The biaxial actuator 24 is moved along the radial direction of the optical disk medium by the feed motor 25a. Also, this biaxial actuator 24 is provided with an actuator (focus control actuator) 25b for moving the optical pickup 23 in a direction perpendicular to the surface of the optical disk medium. In this way, a distance between an objective lens body 14 contained in the optical pickup 23 and the surface of the optical disk medium is controlled.

The drive amp 26 controls rotation amount of the feed motor 25a. Also, this drive motor 26 drives the focus control actuator 25b of the biaxial actuator 24 in accordance with signals input from the servo signal processing section 28.

The RF amp 27 receives respective output signals of a plurality of light detecting elements from the optical pickup 23. The RF amp 27 generates and outputs at least one of an FE signal and a PI signal as received light signals based on these received output signals.

The servo signal processing section 28 can be implemented using, for example, an A/D converter for converting servo signals to digital signals, and a DSP (digital signal processor) for subjecting the converted digital signals to digital signal processing. This servo signal processing section 28 detects a peak of the PI signal output by the RF amp 27.

Also, the servo signal processing section 28 detects whether or not this PI signal has exceeded a predetermined PI signal threshold value (FOK; Focus OK). Further, this servo signal processing section 28 performs specified processing using a predetermined FE signal threshold (FZC; Focus Zero Cross), based on the FE signal output by the RF amp 27. This processing will be described in detail later. The servo signal processing section 28 outputs these detection results and results of specified processing to the servo processing control section 29.

Further, the servo signal processing section 28 outputs signals relating to drive of the focus control actuator 25b to the driver amp 26 in accordance with commands input from the servo processing control section 29.

The servo processing control section 29 is a microcomputer, for example, and includes execution modules and storage elements. Storage elements of this servo processing control section 29 are computer readable storage media, and store programs to be executed and parameters. It is also possible for this program to be provided in a state stored in another computer readable storage medium such as DVD-ROM, and be duplicated in the storage elements. Execution modules of the servo processing control section 29 carry out processing in accordance with programs stored in the storage elements.

This servo processing control section 29 receives input of signals (signal relating to results of PI signal peak detection and processing result signals relating to the FE signal) etc. input from the servo signal processing section 28. The servo control processing section 29 then executes processing (focus control processing) to set a distance between the optical pickup 23 and the optical disk medium at a position where focus is achieved at the signal surface based on these received signals. This focus control processing will be described in detail later.

The signal processing section 30 demodulates signals stored in the optical disk medium based on signals output by the RF amp 27. The signal processing section 30 then outputs the demodulated signals. The drive controller 31 is connected to a personal computer, or home game machine or video recorder, constituting a host, and drives the driver amp 26 in response to requests from the host to move the optical pickup 23 to a desired position on the optical disk medium. Demodulated signals output from the signal processing section 30 and stored in the optical disk medium are then output to the host.

Figure 2:
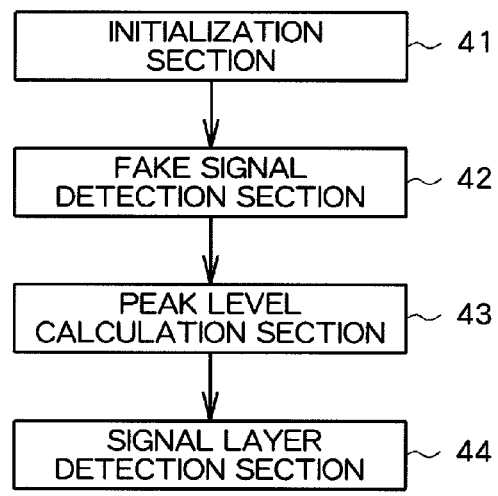
FIG. 2 is a functional block diagram showing an example of an optical disk unit of an embodiment of the present invention.

Focus control processing using the optical disk unit of this embodiment will now be described. With this embodiment, focus control processing is implemented in software by the servo processing control section 29. Specifically, as shown in FIG. 2, the servo processing control section 29 is functionally constructed including an initialization section 41, a fake signal detection section 42, a peak level calculation section 43 and a signal layer detection section 44.

The initialization section 41 drives the spindle motor 22 to rotate and thus rotates the optical disk medium. Also, this initialization signal 41 sets a wavelength of light irradiated by the optical pickup 23 to a value established as a predetermined initial value. The initialization section 41 also drives the focus control actuator 25b so that the objective lens of the optical pickup 23 is moved to a position (initial position) that is furthest away from the surface of the optical disk medium. The initialization section 41 commences control to move the lens towards the surface of the optical disk medium at a specified speed once the objective lens of the optical pickup 23 has been moved to the initial position.

The fake signal detection signal 42 detects surface reflection from the PI signal or the FE signal output by the servo signal processing section 28 and detects the first fake signal appearing after the surface reflection. As an example, using an FE signal after the initialization section 41 has commenced movement of the objective lens of the optical pickup 23, this fake signal detection section 42 determines that surface reflection has been detected when the FE signal initially exceeds an upper peak and then crosses a reference position (zero cross). Then, when the FE signal next exceeds the upper peak and performs a zero cross, it is determined that an initial fake signal (Fake) has been detected. This fake signal detection section 42 is also provided with a peak hold circuit, and holds the immediately preceding peak value. The fake signal detection section 42 then outputs a peak value pbase held by the peak hold circuit to the peak level calculation section 43 when it has been determined to be focused on the initial fake signal (Fake). This peak value pbase is used as a value constituting a basis for a threshold value which is for detecting a signal layer.

As another specific example of this fake signal detection section 42, it is possible to use a PI signal after the initialization section 41 has commenced movement control of the objective lens of the optical pickup 23, and establish a peak value pbase constituting a basis for a threshold value for signal layer detection. In this case, the fake signal detection section 42 determines that surface reflection has been detected when the value of the initial PI signal becomes the peak value. Then, when the PI signal next becomes the peak value, it is determined that an initial fake signal (Fake) has been detected. Incidentally, in the peak detection thus far, in order to eliminate the effects of noise, it is also possible to set a threshold value at which a noise level is exceeded (noise elimination threshold), set detection of surface reflection when an initial peak value exceeding the noise elimination threshold is detected, and detect a fake signal (Fake) when the next peak value is detected. This fake signal detection section 42 is also provided with a peak hold circuit, and holds the immediately preceding peak value. The fake signal detection section 42 then outputs a peak value held by the peak hold circuit to the peak level calculation section 43 as a peak value pbase constituting a basis for a threshold value for signal layer detection when it has been determined that the initial fake signal (Fake) has been focused.

As a further example of this fake signal detection section 42, it is possible to use both a PI signal and FE signal after the initialization section 41 has commenced movement of the objective lens of the optical pickup 23, and establish a peak value pbase constituting a basis for a threshold value for signal layer detection. In this case, the fake signal detection section 42 determines that surface reflection has been detected when the value of the initial PI signal becomes the peak value. In this peak detection, in order to eliminate the effects of noise, it is also possible to set a threshold value at which a noise level is exceeded (noise elimination threshold), and detect surface reflection when an initial peak value exceeding the noise elimination threshold is detected.

Then, after surface reflection has been detected using the PI signal, the fake signal detection section 42 determines that an initial fake signal (Fake) has been detected when the FE signal exceeds the upper peak and performs a zero cross. This fake signal detection section 42 is also provided with a peak hold circuit, and holds a peak value of the immediately preceding FE signal using this peak hold circuit. It is also possible for the fake signal detection section 42 to then output a peak value pFE held by the peak hold circuit to the peak level calculation section 43 as a peak value pbase constituting a basis for a threshold value for signal layer detection when it has been determined that the initial fake signal (Fake) has been focused on.

Even in the event that a peak value pFE of the FE signal is detected, it is possible for the fake signal detection section 42 to also detect a peak value (peak value at the time of fake signal (Fake) detection) pPI of the next PI signal after surface reflection has been detected, and to output the peak value pFE of the FE signal as pbase, and also to output this pPI to the peak level calculation section 43, which can be used in signal layer detection.

The peak level calculating section 43 receives the peak value pbase input from the fake signal detection section 42. The peak level calculation section 43 uses this received peak value pbase as a value constituting the basis of a threshold value for signal layer detection. Specifically, the peak level calculating section 43 establishes a threshold value based on this peak value base, and outputs the established threshold value to the signal layer detection section 44. Here the threshold value can be the peak value pbase itself. Or, the threshold value can be set higher than by a level that is a fixed proportion (for example, between 5 and 10%) of the peak value pbase (pbase×1.05 to pbase×1.1) taking into consideration variations in measurement of the peak value in the fake signal detection section 42. Incidentally, as has already been described, in the case of carrying out signal layer detection using the FE signal, using first and second threshold values FZC1, FZC2 (|FZC1|>|FZC2|) it is determined that focus has been achieved when the absolute value of the FE signal becomes a peak exceeding the first threshold value (FZC1), and then the absolute value of the next FE signal drops below the second threshold value (FZC2). As a result, in the event that the fake signal detection section 42 outputs a peak signal pFE of the FE signal as a value pbase constituting the basis of the signal layer detection threshold value, the peak level calculating section 43 sets a threshold value that is generated and output based on this pbase to the first threshold level FZC1, being a threshold value relating to the peak level.

Also in the case where the fake signal detection section 42 outputs the peak value pPI of the PI signal as a value pbase constituting the basis for a signal layer detection threshold, a threshold value is established based on the peak value pbase (=pPI) output by the fake signal detection section 41, and the established threshold value is output to the signal layer detection section 44. Here the threshold value can be the peak value pbase, or can be set higher by a level that is a fixed proportion (for example, between 5 and 10%) of the peak value pbase (p×1.05 to p×1.1) taking into consideration variations in measurement of the peak value in the fake signal detection section 42. In this case, the threshold value output by the peak level calculating section 43 is used as FOK relating to the PI signal.

Even in the event that the fake signal detection section 42 outputs the peak value pFE of the FE signal as a value pbase constituting the basis for a signal layer detection threshold, if a peak value pPI of the PI signal at the time of detection of the initial fake signal (Fake) with the PI signal is also input, a threshold value FZC1 is established based on pbase, and a threshold value FOK for the PI signal is calculated based on the peak value pPI. Here, FOK can also use the input peak value pPI directly, or can use pPI increased in level by a fixed proportion (for example, 5 to 10%). In this case, the peak level calculating section 43 also outputs FOK relating to the PI signal together with the first threshold value FZC1 relating to the FE signal.

Specifically, the signal layer detection section 44 detects a position of focus on the signal layer using a signal used by the fake signal detection section 42, from the PI signal or the FE signal output by the servo signal processing section 28. As an example, in the case the fake signal detection section 42 is using the FE signal, it is determined that the signal layer has been detected when the FE signal exceeds the threshold value FZC1 established by the peak level calculating section 43, and then drops below the predetermined second threshold level FZC2 (FZC2<FZC1).

Also, when the peak level calculating section 43 outputs a threshold value FOK for the PI signal and a threshold value FZC1 for the FE signal, the signal layer detection section 44 performs a signal layer detection operation using the FE signal within a period when the input PI signal exceeds the threshold value FOK. Specifically, within the period, it is determined that the signal layer has been detected when the FE signal exceeds the threshold value FZC1 established by the peak level calculating section 43, and then drops below the predetermined second threshold level FZC2 (FZC2<FZC1).

Also, in the case of using only the PI signal, the signal layer detection section 44 receives the threshold value (FOK relating to the PI signal) output by the peak level calculating section 43, and determines that the signal layer is in focus when a peak exceeding this threshold value FOK is detected from the PI signal.

Figure 3:
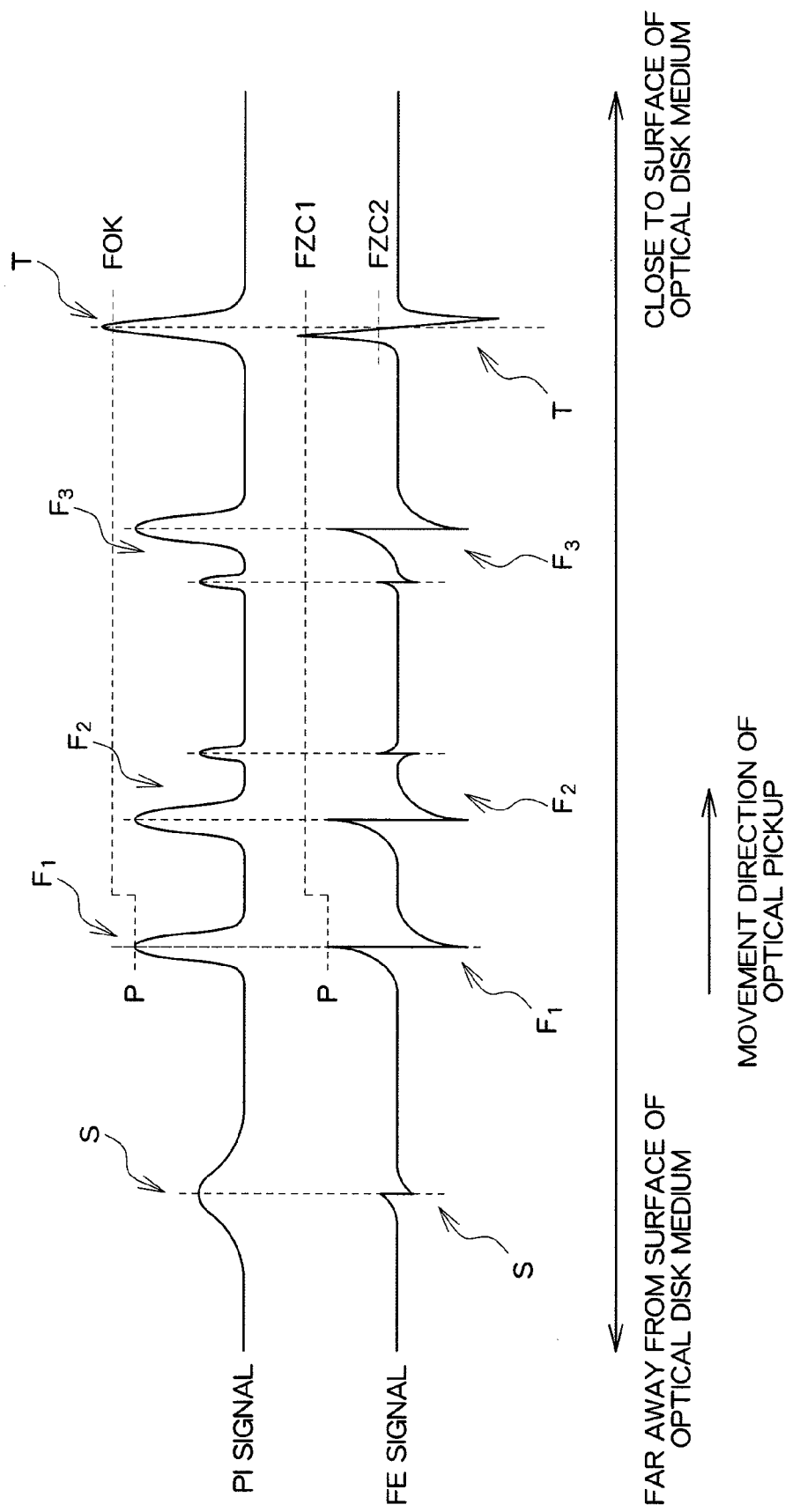
FIG. 3 is an explanatory drawing showing an example of signals detected by an optical pickup of the optical disk unit of an embodiment of the present invention.

With these configurations, the optical disk unit of this embodiment operates as follows. Specifically, in a state where the level of a signal detected by the optical pickup 23 is not falling, the objective lens of the optical pickup 23 is brought close to the optical disk medium from a position separated from the optical disk medium, and as shown in FIG. 3 image formation using surface reflection of the PI signal and the FE signal is detected (S). Then, a fake signal (Fake) is detected at a position where the objective lens is closer to the optical disk medium. The optical disk unit of this embodiment establishes a threshold value (FOK, FZC1) of a level greater than or equal to the level of the fake signal (Fake) detected here. Incidentally, for the sake of explanation threshold values are shown in FIG. 3 for both the PI signal and the FE signal, but it does not matter which one is used.

Here, since the optical disk medium is rotating, there may be occasions when the distance between the surface of the optical disk medium and the optical pickup 23 periodically varies due to axial runout, and the fake signal (Fake) is measured a plurality of times (F2, F3 . . . ). The fake signal (Fake) here is the original fake signal (Fake) appearing periodically, and so appears as peaks that do not exceed FOK or FZC1.

Then, if the objective lens is brought even closer to the optical disk medium, a peak (T) that is higher than the threshold value (FOK or FZC1) determined based on the level of the fake signal (Fake) is respectively detected in the PI signal and the FE signal.

In the event that the optical disk unit executes focus processing to the signal surface using the PI signal, it is determined that the signal surface has been detected at a position (T) where the PI signal exceeds the established threshold value FOK, and processing transfers to focus servo control. Specifically, if focus servo for the objective lens is "ON", an operation to move the objective lens to track upward and downward movement of the optical disk medium is commenced, and data reproduction is carried out.

On the other hand, in the event that the optical disk unit executes focus processing to the signal surface using the FE signal, it is determined that the signal surface has been detected at a position (T) where the FE signal exceeds the established threshold value FZC1 and further drops below the established threshold FZC2, and processing transfers to focus servo control.

Figure 4:
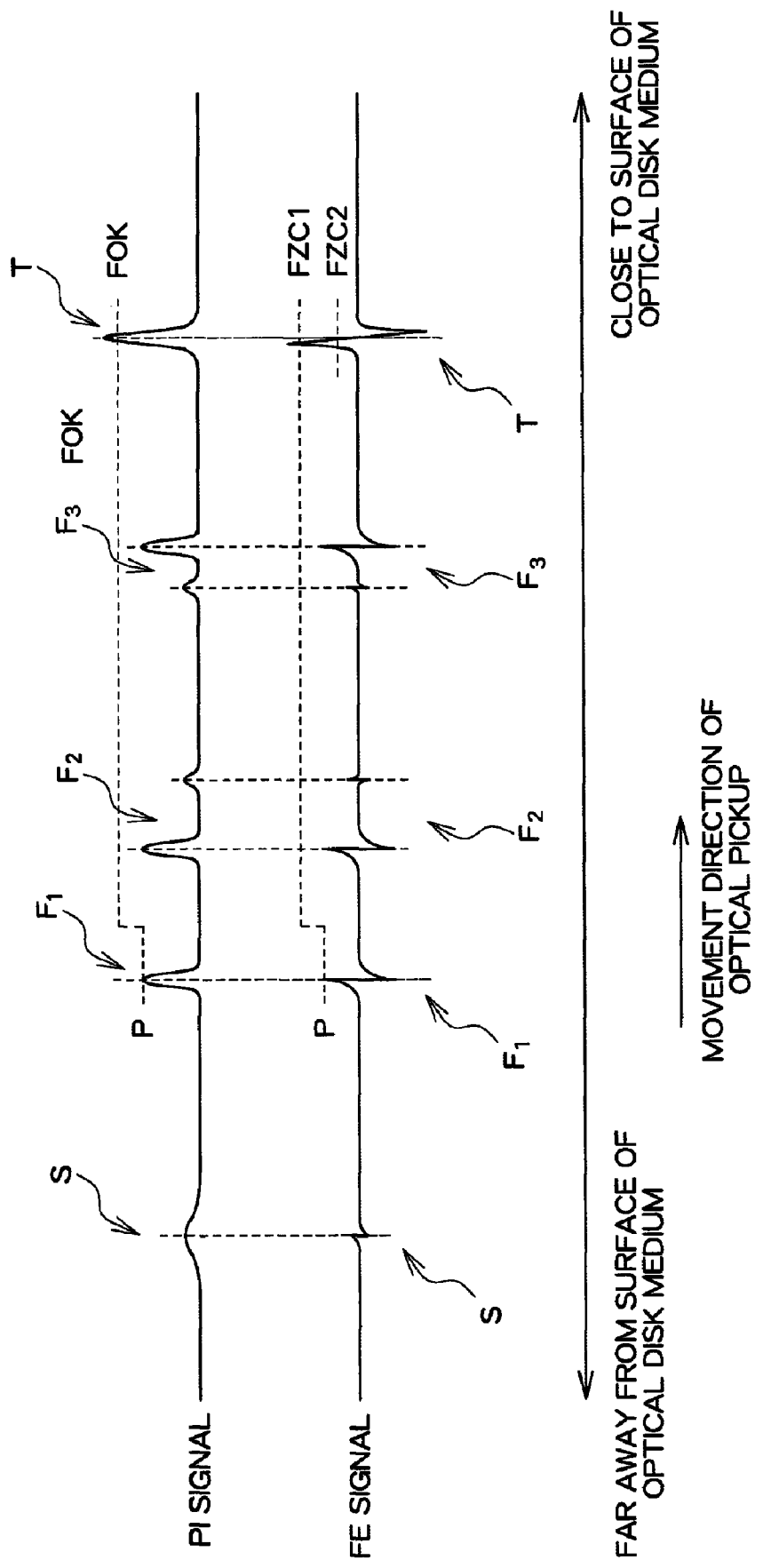
FIG. 4 is an explanatory drawing showing another example of signals detected by an optical pickup of the optical disk unit of an embodiment of the present invention.

Next, for this optical disk unit, description will be given for the case where the level of a signal detected by the optical pickup 23 has fallen. In this case also, the objective lens of the optical pickup 23 is brought close to the optical disk medium from a position separated from the optical disk medium, and as shown in FIG. 4 image formation using surface reflection of the PI signal and the FE signal is detected (S). Then, a fake signal (Fake) is detected at a position where the objective lens is even closer to the optical disk medium. The level of the fake signal (Fake) here falls more than the level shown in FIG. 3 in accordance with the fact that the level of the signal detected by the optical pickup 23 is falling.

The optical disk unit of this embodiment establishes a threshold value (FOK, FZC1) of a level greater than or equal to the level of the fake signal (Fake) detected here. For the sake of explanation in FIG. 4 also, threshold values are shown for both the PI signal and the FE signal, but it does not matter which one is used. The threshold value established here (either FOK or FZC1) is a lowered level compared to that shown in FIG. 3, in accordance with the lowering of the level of the fake signal (Fake).

Further, there may be occasions when the distance between the surface of the optical disk medium and the optical pickup 23 periodically varies due to rotation and axial runout of the optical disk medium, and the fake signal (Fake) is measured a plurality of times (F2, F3 . . . ). The fake signal (Fake) here is the original fake signal (Fake) appearing periodically, and so appears as peaks that do not exceed FOK or FZC1.

Then, if the objective lens is brought even closer to the optical disk medium, a peak that is higher than the threshold value (FOK or FZC1) determined based on the level of the fake signal (fake) is respectively detected in the PI signal and the FE signal.

In the event that the optical disk unit executes focus processing to the signal surface using the PI signal, it is determined that the signal surface has been detected at a position where the PI signal exceeds the established threshold value FOK, and processing transfers to focus servo control.

On the other hand, in the event that the optical disk unit executes focus processing to the signal surface using the FE signal, it is determined that the signal surface has been detected at a position where the FE signal exceeds the established threshold value FZC1 and further drops below the established threshold FZC2, and processing transfers to focus servo control.

In this way, according to this embodiment, a fake signal (Fake) occurring within the optical pickup 23 is detected by surface reflected light, and reflected light at the signal layer is detected utilizing a signal level of the fake signal (Fake). Therefore, even if the level of the signal detected by the optical pickup 23 is lowered overall due to dirt attached to the optical pickup 23 or environmental variations such as temperature, since reflected light at the signal layer is detected at a threshold that has been corrected by the signal level of the fake signal (Fake), it is made possible to achieve focus at the signal layer regardless of the state of the optical pickup 23.

Incidentally, here, in the peak level calculation section 43, description has been given of an example where the peak value pbase of the fake signal detection section 42 is output as a threshold value either as it is, or increased by a level that is a specified proportion of the peak value pbase, but this is not limiting and it is also possible to have the following.

First, in the optical disk unit, a test disk medium for evaluating axial runout is used, and the level of the fake signal (Fake) was detected a plurality of times. Among the levels detected in this way, a value Ref, being a level 4 to 5 times higher than a distribution $\sigma$ ($4\sigma$ to $5\sigma$) from an average value Ave was referred to, and a coefficient $\alpha$ was established as $$\alpha = Ref/Ave$$

and stored.

Then in the peak level calculating section 43, a peak value p detected by the fake signal detection section 42 and a threshold value using this coefficient $\alpha$ were calculated as $$p \times \alpha$$

In this way, if a coefficient $\alpha$ is established for each optical disk unit it becomes possible to calculate a threshold value taking into consideration individual differences for every optical desk unit.

Also, an example has been described here where a coefficient $\alpha$ is established using a test disk medium for evaluating axial runout, but there is no problem in using a general optical disk medium instead of the test disk medium for evaluating axial runout.

It is also possible for this coefficient $\alpha$ to be determined for every type of machine (for every circuit used, DSP, type of microcomputer, or combination).

Figure 5:
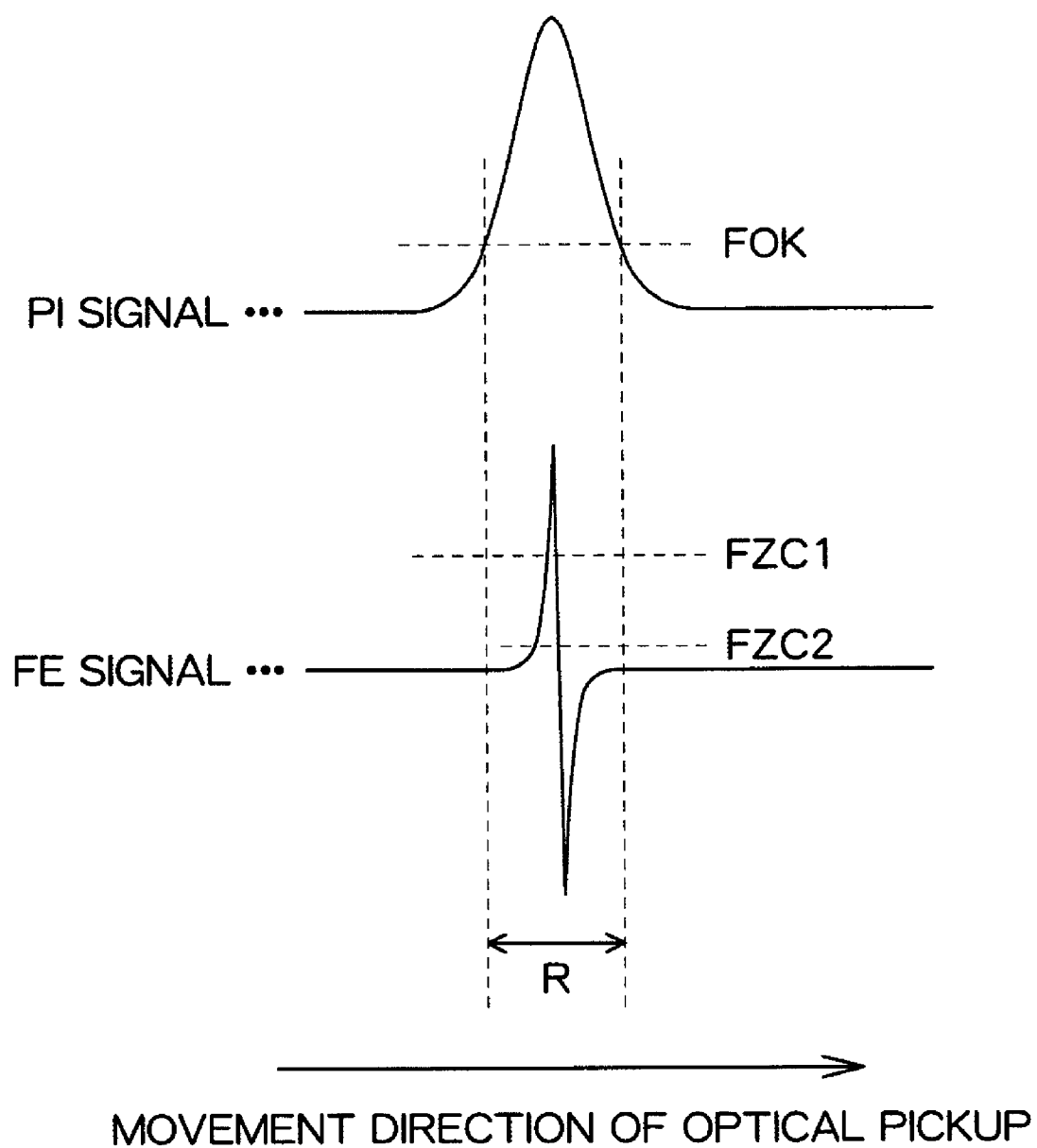
FIG. 5 is an explanatory drawing showing an example of signals relating to movement in focus processing of the optical disk unit of an embodiment of the present invention.

Further, in the description thus far, the signal layer detection section 44 has been described as detecting the signal layer using either of the PI signal or the FE signal, but it is also possible to use both of them. Specifically, as shown in FIG. 5, the signal layer detection section 44 can carry out focus processing to the signal layer using the FE signal in a range (R) where a PI signal exceeding the threshold value FOK, established based on the level of the PI signal at the time a fake signal (Fake) occurs, is being detected. Even in this case, it is also possible to establish the threshold value FZC1 relating to the FE signal based on a level of the FE signal at the time a fake signal (Fake) occurs.

In this example also, FOK and FZC1 can be the level of a signal corresponding to the time a fake signal (Fake) occurs, or can be made values resulting from multiplying the level of a signal corresponding to the time a fake signal (Fake) occurs by a specified coefficient. A coefficient for multiplying the PI signal when a fake signal (Fake) occurs for FOK calculation, and a coefficient for multiplying the FE signal at the time a fake signal (Fake) occurs for FZC1 calculation, can also be different from each other.

Figure 6:
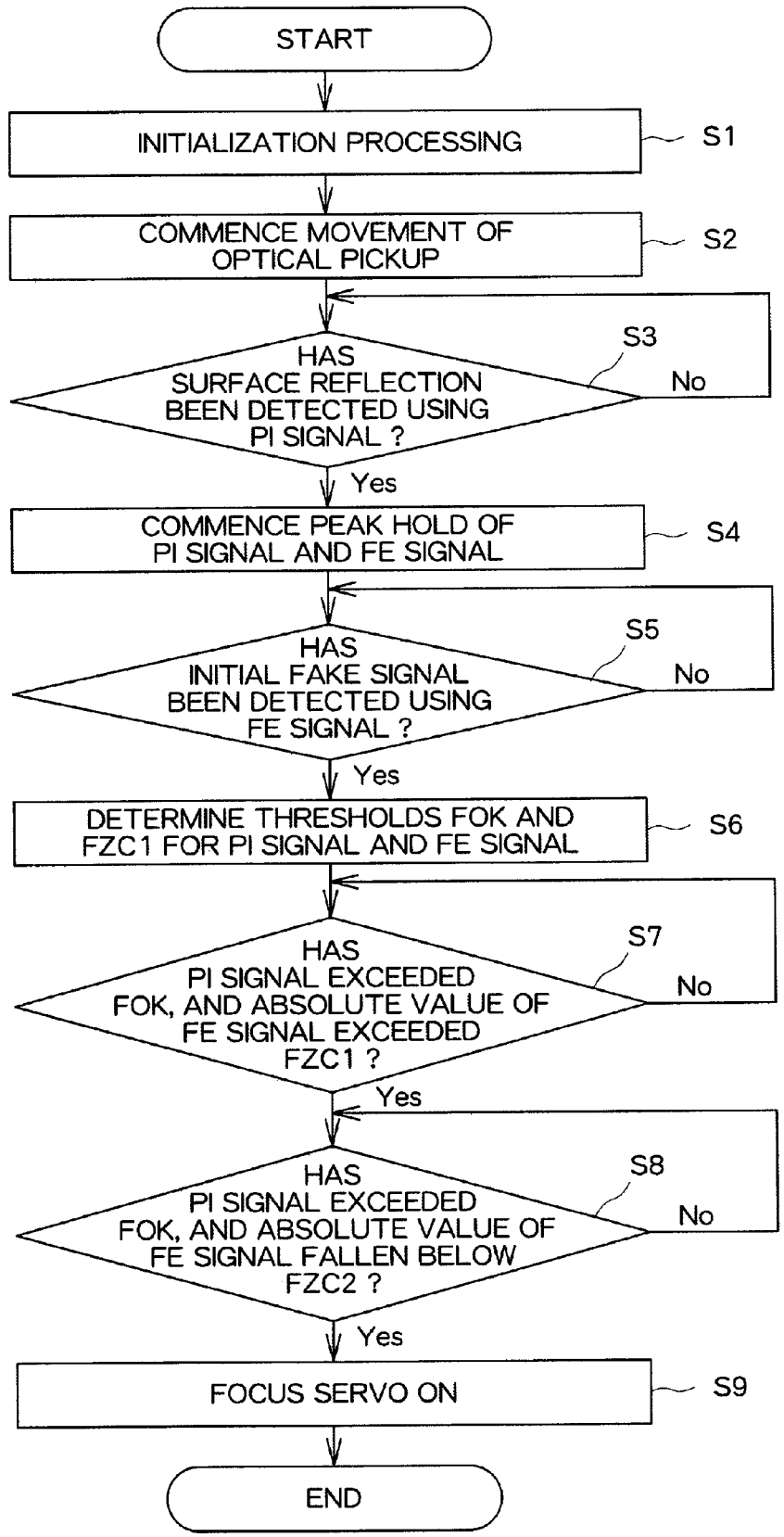
FIG. 6 is a flowchart showing an example of movement in focus processing of the optical disk unit of an embodiment of the present invention.

Specifically, the servo processing control section 29 of this embodiment operates as shown in FIG. 6. That is, the servo processing control section 29 executes initialization processing (S1), drives the spindle motor 22 to rotate so as to rotate the optical disk medium, and sets a wavelength of light irradiated by the optical pickup 23 to a value established as a predetermined initial value. Also, the focus control actuator 25b is driven so that the objective lens of the optical pickup 23 is moved to a position (initial position) that is furthest away from the surface of the optical disk medium.

The servo processing control section 29 then commences movement of the objective lens of the optical pickup 23 towards the surface of the optical disk medium at a specified speed (S2).

The servo processing control section 29 then stands by until an initial peak (namely surface reflection) exceeding a threshold value (noise elimination threshold value) that exceeds a noise level, in order to eliminate noise, is detected, using the PI signal after commencement of movement of the objective lens of the optical pickup 23 (S3).

Then, if surface reflection is detected, the servo processing control section 29 commences hold of peak values of the PI signal and the FE signal after detection of surface reflection (S4), and then stands by until the FE signal passes an upper peak initially appearing after detection of surface reflection, and crosses a reference value (zero cross) (S5). If the FE signal exceeds the initially appearing upper peak and further performs a zero cross, the servo processing control section 29 determines that an initial fake signal (Fake) has been detected. The servo processing control section 29 then establishes a threshold value FOK for the PI signal and a threshold value FZC1 (FZC1>0) for the FE signal in order to detect the signal surface, based on peak values (respectively expressed as pPI and pFE, here pFE>0) of (absolute values of) the PI signal and the FE signal that are being held (S6).

For example, with this processing S6, it is possible to make $FOK = pPI \times \beta$, and $FZC1 = pFE \times \gamma$ Here $\beta$ and $\gamma$ are values greater than "1", for example, "1" or values between "1.05" and "1.1". $\beta$ and $\gamma$ can have the same value, or different values.

The servo processing control section 29 stands by until the PI signal becomes greater than or equal to FOK determined in processing S6, and the FE signal exceeds FZC1 (S7). Then, if the PI signal becomes greater than or equal to FOK determined in processing S6, and the absolute value of the FE signal exceeds FZC1, there is again a standby state until the PI signal reaches FOK determined in processing S6 and the absolute value of the FE signal becomes smaller than a predetermined FZC2 (0<FZC2<FZC1) (S8) Then, if the PI signal becomes greater than or equal to FOK determined in processing S6 and the absolute value of the FE signal becomes smaller than a predetermined FZC2 (0<FZC2<FZC1), the servo processing control section 29 determines that the signal layer has been detected, and the focus control actuator 25*b* is controlled so that there is a transfer from operation to move the objective lens of the optical pickup 23 towards the surface of the optical disk medium to focus servo control where a focus servo is turned on (S9).

Figure 7:
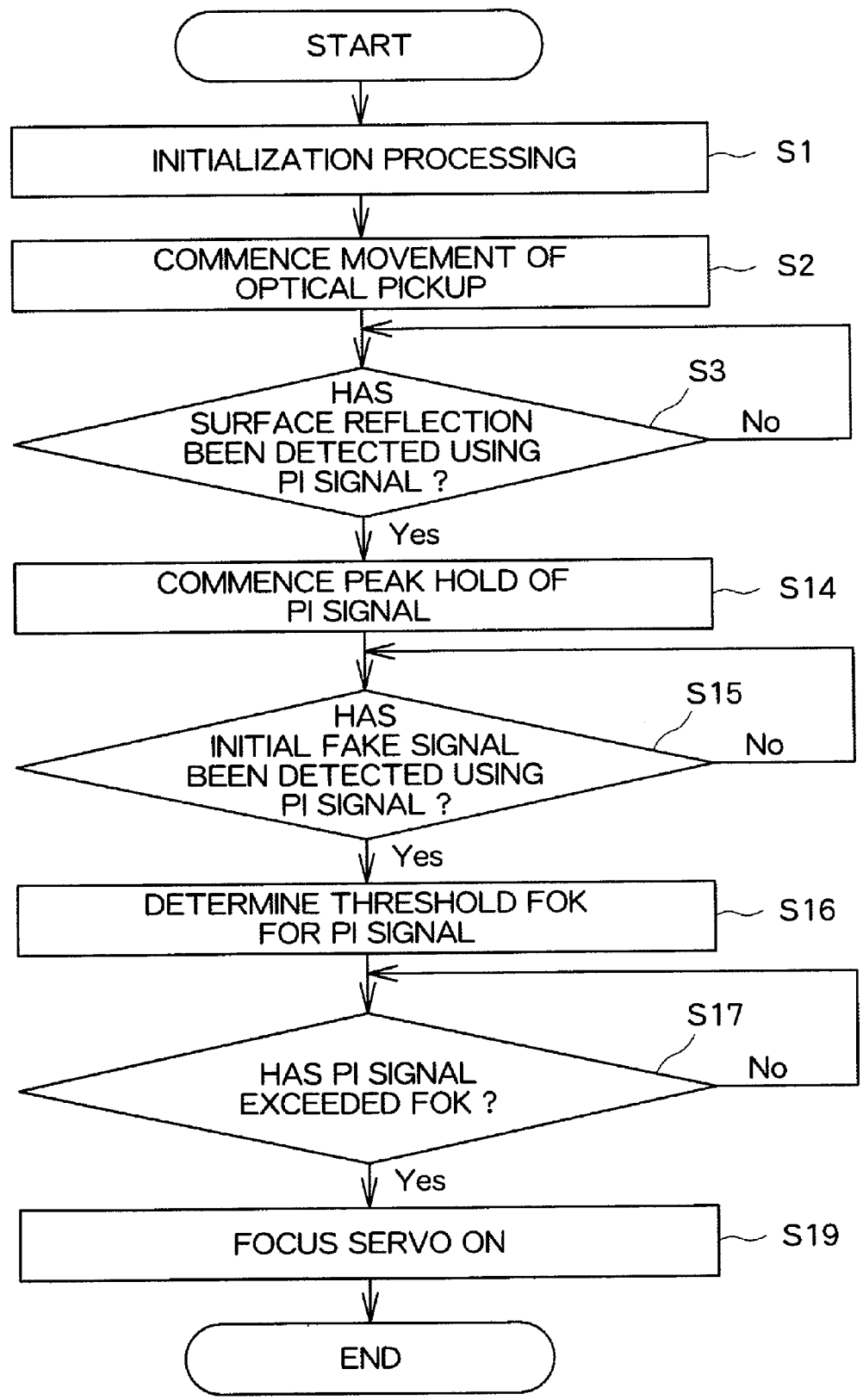
FIG. 7 is a flowchart showing another example of movement in focus processing of the optical disk unit of an embodiment of the present invention.

Also, with a different example, the servo processing control section 29 of this embodiment operates as shown in FIG. 7. Parts that are the same as the operation of FIG. 6 have the same reference numerals attached, and detailed description thereof is omitted.

Specifically, the servo processing control section 29 executes initialization processing (S1) then commences movement of the objective lens of the optical pickup 23 towards the surface of the optical disk medium at a specified speed (S2).

The servo processing control section 29 then stands by until an initial peak (namely surface irradiation) exceeding a threshold value (noise elimination threshold value) exceeding a noise level, in order to eliminate noise, is detected, using the PI signal after commencement of movement of the objective lens of the optical pickup 23 (S3).

If surface reflection is detected, the servo processing control section 29 then commences holding of a peak value of the PI signal (S14) and then stands by until a peak initially appearing in the PI signal is detected (S15). If a peak of the PI signal is detected, the servo processing control section 29 determines that an initial fake signal (Fake) has been detected, and establishes a threshold value FOK for the PI signal in order to detect the signal surface, based on peak values (expressed as pPI) of the PI signal that are being held (S16).

For example, with this processing S16, it is possible to make $FOK = pPI \times \beta$.

Here $\beta$ is a value values greater than "1", for example, "1" or, values between "1.05" and "1.1".

The servo processing control section 29 stands by until the PI signal becomes greater than or equal to FOK established in processing S16 (S17). Then, if the PI signal becomes greater than or equal to FOK determined in processing S16 it is determined that the signal layer has been detected, and the focus control actuator 25*b* is controlled so that from operation to move the objective lens of the optical pickup 23 towards the surface of the optical disk medium, a focus servo is turned on and there is a transfer to focus servo control (S19).

With the examples of FIG. 6 and FIG. 7, surface reflection is detected using the PI signal in both cases, but it is possible to carry out detection using the FE signal.

Also, description has been given here of an example where after the signal surface has been detected a focus servo is turned on and a signal reproduced, but after signal surface detection, in the event that reflectance of the signal layer is measured, it is also possible to suspend the operation of the objective lens in the processing S9 and the processing S19 in FIG. 6 and FIG. 7 described above, and measure reflectance of the signal layer.

While the present invention is described in terms of preferred or exemplary embodiments, it is not limited thereto.

What is claimed is:

1. An optical disk unit for reading signals stored on an optical disk medium, comprising:

an optical pickup for selectively irradiating light of one wavelength, from several mutually different wavelengths, to an optical disk medium by means of a single objective lens, and outputting signals based on light reflected by the optical disk medium;

a drive section for relatively moving an objective lens of the optical pickup with respect to an optical disk medium surface;

a signal output section for receiving light reflected by the optical disk medium and outputting received light signals based on the received light; and a control section for detecting, while the objective lens is being moved relative to the optical disk medium surface by the drive section, a surface reflection of the optical disk surface and, after the detection of the surface reflection, a peak level of a fake signal generated in the received light signal, the fake signal corresponding to stray light occurring inside the optical pickup, comparing the received light signal with a threshold value that is set based on the detected peak level, and detecting reflected light of a data storage layer.

2. The optical disk unit of claim 1, wherein
the control section establishes a value that is larger than a peak level of the detected fake signal as a threshold value.

3. A method for controlling an optical disk unit for reading signals stored on an optical disk medium, the method comprising:
controlling an optical pickup to selectively irradiate light of one wavelength, from several mutually different wavelengths, to an optical disk medium by means of a single objective lens, and to output signals based on light reflected by the optical disk medium,
causing relative movement of the objective lens of the optical pickup with respect to a surface of the optical disk medium,
receiving light reflected by the optical disk medium and outputting received light signals based on the received light,
detecting, while the objective lens is being moved relative to the optical disk medium surface, a surface reflection of the optical disk surface and, after the detection of the surface reflection, a peak level of a fake signal generated in the received light signal, the fake signal corresponding to stray light occurring inside the optical pickup, and
comparing the received light signal with a threshold value that is set based on the detected peak level, to detect reflected light of a data storage layer.

4. A non-transitory computer readable storage medium storing a program to cause execution of process, in an optical disk unit for reading signals stored on an optical disk medium, comprising:
controlling an optical pickup to selectively irradiate light of one wavelength, from several mutually different wavelengths, to an optical disk medium by means of a single objective lens, and to output signals based on light reflected by the optical disk medium,
causing relative movement of the objective lens of the optical pickup with respect to a surface of the optical disk medium,
receiving light reflected by the optical disk medium and outputting received light signals based on the received light,
detecting, while the objective lens is being moved relative to the optical disk medium surface, a surface reflection of the optical disk surface and, after the detection of the surface reflection, a peak level of a fake signal generated in the received light signal, the fake signal corresponding to stray light occurring inside the optical pickup, and
comparing the received light signal with a threshold value that is set based on the detected peak level, to detect reflected light of a data storage layer.

* * * * *